(12) United States Patent
Narayanan et al.

(10) Patent No.: US 7,122,932 B2
(45) Date of Patent: Oct. 17, 2006

(54) ROTOR FOR AN INDUCTION DEVICE

(75) Inventors: Rajmohan Narayanan, Greer, SC (US); Boris A. Shoykhet, Beachwood, OH (US); David I. Driscoll, South Euclid, OH (US)

(73) Assignee: Reliance Electric Technologies, LLC, Mayfield Heights, OH (US)

( * ) Notice: Subject to any disclaimer, the term of this patent is extended or adjusted under 35 U.S.C. 154(b) by 0 days.

(21) Appl. No.: 10/955,640

(22) Filed: Sep. 30, 2004

(65) Prior Publication Data

US 2006/0066157 A1    Mar. 30, 2006

(51) Int. Cl.
*H02K 1/00*    (2006.01)
(52) U.S. Cl. ........................... 310/216; 310/262
(58) Field of Classification Search ................ 310/211, 310/261, 262, 254, 258–259, 216–218
See application file for complete search history.

(56) References Cited

U.S. PATENT DOCUMENTS

| | | | | |
|---|---|---|---|---|
| 2,248,167 A | | 7/1941 | Elsey | ........................ 29/155.53 |
| 2,499,390 A | | 5/1950 | Joy | ............................ 172/120 |
| 3,270,223 A | * | 8/1966 | Seely | ........................... 310/62 |
| 3,597,646 A | * | 8/1971 | Lawrenson | .................. 310/166 |
| 3,621,351 A | * | 11/1971 | Goto et al. | ................... 318/812 |
| 3,826,940 A | | 7/1974 | McKean et al. | ............. 310/211 |
| 4,970,424 A | | 11/1990 | Nakamura et al. | ........... 310/262 |
| 5,422,527 A | * | 6/1995 | Lazzaro | ....................... 310/211 |
| 6,088,906 A | * | 7/2000 | Hsu et al. | ....................... 29/598 |

* cited by examiner

*Primary Examiner*—Thanh Lam
(74) *Attorney, Agent, or Firm*—Patrick S. Yoder; Alexander M. Gerasimow

(57) ABSTRACT

According to one embodiment, the present invention provides a rotor assembly. The exemplary rotor assembly includes a plurality of rotor laminations, which cooperate to form a rotor core, capped at each end by end members. Extending through the rotor core and the end members, a plurality of rotor channels is configured to receive electrically conductive members therethrough. Each of the electrically conductive members has external portions, which extend beyond the rotor channel, and an interior portion that is housed within the rotor channel. By flexing the external portions, a compression force that secures the laminations and the end members with respect to one another may be provided. Advantageously, the external portions may be fused to one another and/or to the end members. As one example, the external portions may be fused through the introduction of a molten metal into the end member. Advantageously, fusing of the external portions to the end members and/or one another increases the mechanical integrity of the rotor and provides for good electrical communicativeness between the conductive members, for example.

25 Claims, 7 Drawing Sheets

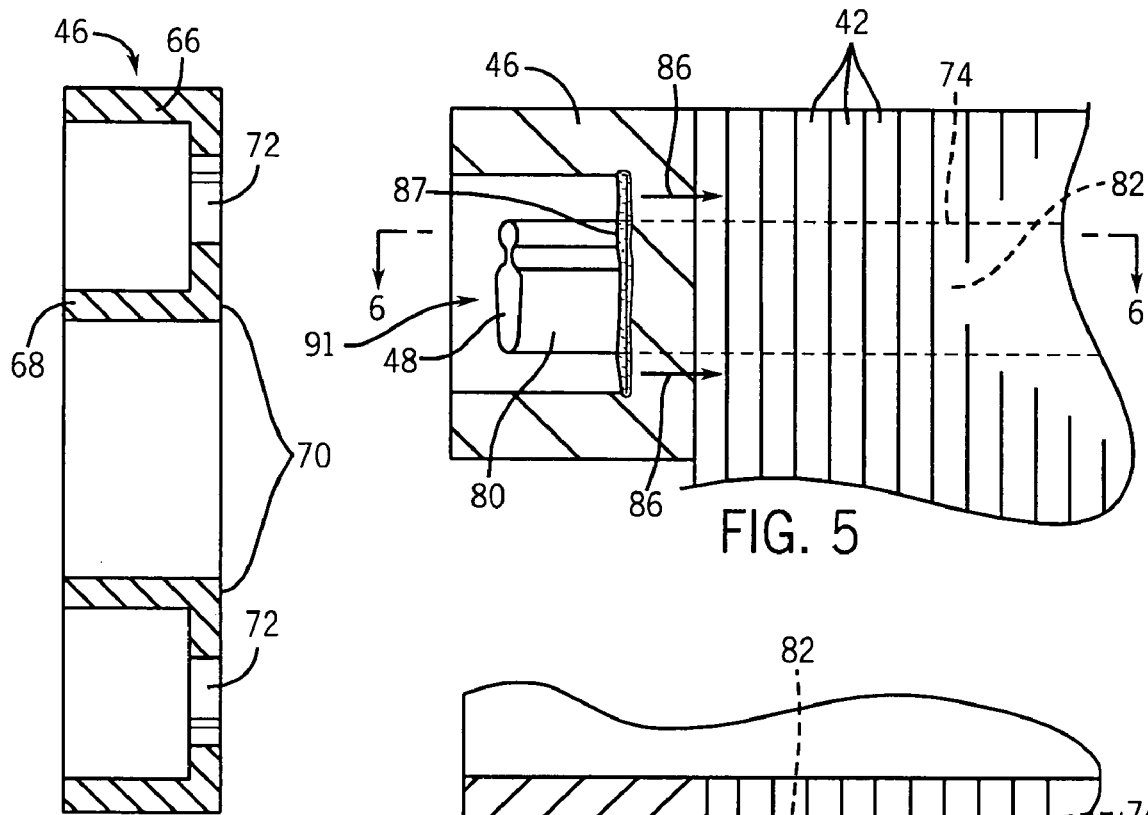
FIG. 4
FIG. 5
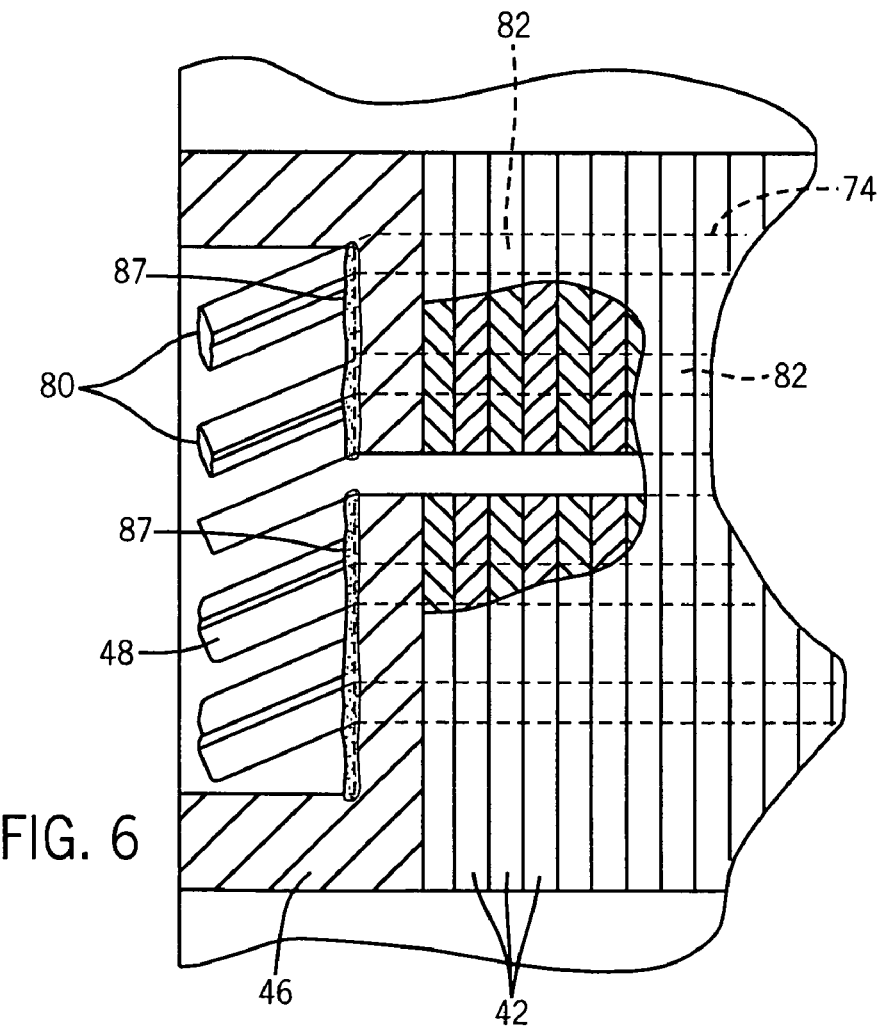
FIG. 6

ROTOR FOR AN INDUCTION DEVICE

BACKGROUND

The present invention relates generally to the field of electric motors and, particularly, to rotors for induction devices, such as a fabricated squirrel cage rotor, for example.

Electric motors of various types are commonly found in industrial, commercial and consumer settings. In industry, such motors are employed to drive various kinds of machinery, such as pumps, conveyors, compressors, fans and so forth, to mention only a few. Conventional alternating current (ac) electric motors may be constructed for single- or multiple-phase power, and are typically designed to operate at predetermined speeds or revolutions per minute (rpm), such as 3600 rpm, 1800 rpm, 1200 rpm, and so on. Such motors generally include a stator comprising a multiplicity of windings surrounding a rotor, which is supported by bearings for rotation in the motor frame. Typically, the rotor comprises a core formed of a series of magnetically conductive laminations arranged to form a lamination stack capped at each end by electrically conductive end rings. Additionally, typical rotors include a series of conductors that are formed of a nonmagnetic, electrically conductive material and that extend through the rotor core. These conductors are electrically coupled to one another via the end rings, thereby forming one or more closed electrical pathways.

In the case of ac motors, applying ac power to the stator windings induces a current in the rotor, specifically in the conductors. The electromagnetic relationships between the rotor and the stator cause the rotor to rotate. The speed of this rotation is typically a function of the frequency of ac input power (i.e., frequency) and of the motor design (i.e., the number of poles defined by the stator windings). A rotor shaft extending through the motor housing takes advantage of this produced rotation and translates the rotor's movement into a driving force for a given piece of machinery. That is, rotation of the shaft drives the machine to which it is coupled.

Often, design parameters call for relatively high rotor rotation rates, i.e., high rpm's. By way of example, a rotor within an induction motor may operate at 10,000 rpm, and beyond. Based on the diameter of the rotor, operation at such rpm's translates into relatively high surface speeds on the rotor. Again, by way of example, rotor surface speeds may reach values of 100 meters per second (mps), and beyond. During operation, particularly during high-speed operation, produced centripetal and centrifugal forces strain various components of the rotor assembly. For example, if not properly accounted for, the centripetal and centrifugal forces developed in the end ring may cause the end ring to prematurely malfunction. Moreover, centripetal and centrifugal forces may, over time, negatively affect the mechanical integrity of the rotor, leading to a lessening of performance and, in certain instances, failure of the motor. Undeniably, loss of performance and motor failure are events that can lead to unwanted costs and delays.

There exists a need, therefore, for method and apparatus for improved rotor construction and integrity.

BRIEF DESCRIPTION

According to one exemplary embodiment, the present invention provides a rotor for an electric motor. The exemplary rotor includes a rotor core having a generally circular cross-section and a series of rotor slots extending through the core in a direction generally transverse to the cross-section. The exemplary rotor also includes a pair of end members disposed at opposite ends of the rotor core. Each end member has a series of end slots that cooperate with the rotor slots to form rotor channels that extend through the rotor core and the end members. The rotor channels are configured to support electrically conductive members, which each include an interior portion disposed in the rotor channel and oblique portions that extend beyond the rotor channel. In the exemplary rotor, the oblique portions at least partially secure the end members to the rotor core, and the end members facilitate electrical communication between the electrically conductive members. By way of example, the oblique portions and the end members may be fused to one another to improve the mechanical integrity and electrical communicativeness between the two members.

In accordance with another embodiment, the present invention provides an exemplary process for fabricating a rotor for an electric motor. The exemplary process includes the act of aligning a series of rotor laminations with respect to one another to form a rotor core having a series of concentric passageways extending therethrough. The method also includes the act of aligning the end slots of end members disposed on opposite sides of the rotor core with the rotor slots to form a series of rotor channels, which extend through the rotor core and the end members. In the exemplary process, a series of conductive members are inserted through the rotor channels such that each conductive member includes an interior portion housed in the rotor channel and external portions that extend beyond the rotor channel. To secure the laminations and the end members with respect to one another, the external portions of the conductive members are flexed with respect to the end members. Accordingly, the external portions of the conductive members restrict axial displacement of the end members with respect to the rotor core and, as such, increase the mechanical integrity of the rotor core. In other words, the external portions provide a compressive force to secure to components of the rotor with respect to one another. Additionally, as one example, the external portions may be fused to the corresponding end member to increase mechanical support to the rotor and to increase the electrical communicativeness between the conductive members and the end members.

As another exemplary embodiment, the end members of a rotor each act as a cup into which a molten metal is poured. Advantageously, the introduction of molten flow in the cupped end member and around the extended portions of the conductor bars causes the conductor bars to fuse with the molten metal and the end members, for example.

DRAWINGS

The foregoing and other advantages and features of the invention will become apparent upon reading the following detailed description and upon reference to the drawings in which:

FIG. 4 is a cross-section view of an end member of the rotor of FIG. 3 along line 4—4;

FIG. 5 is a detail view of the rotor end member assembly of FIG. 2 within line 5—5;

FIG. 6 is a partial cross-section view of the rotor end member assembly of FIG. 5 along line 6—6;

DETAILED DESCRIPTION

As discussed in detail below, embodiments of the present invention provide apparatus and methods for rotor construction for induction motors. Although the following discussion focuses on induction motors, the present invention also affords benefits to a number of applications in which the rotor integrity is a concern. Indeed, the present technique is applicable to any number of devices, such as induction generators, to name but one additional example. Accordingly, the following discussion provides exemplary embodiments of the present invention and, as such, should not be viewed as limiting the appended claims to the embodiments described.

As a preliminary matter, the definition of the term "or" for the purposes of the following discussion and the appended claims is intended to be an inclusive "or." That is, the term "or" is not intended to differentiate between two mutually exclusive alternatives. Rather, the term "or" when employed as a conjunction between two elements is defined as including one element by itself, the other element by itself, and combinations and permutations of the elements. For example, a discussion or recitation employing the terminology "'A' or 'B'" includes: "A" by itself "B," and any combination thereof, such as "AB" and/or "BA."

Figure 1:
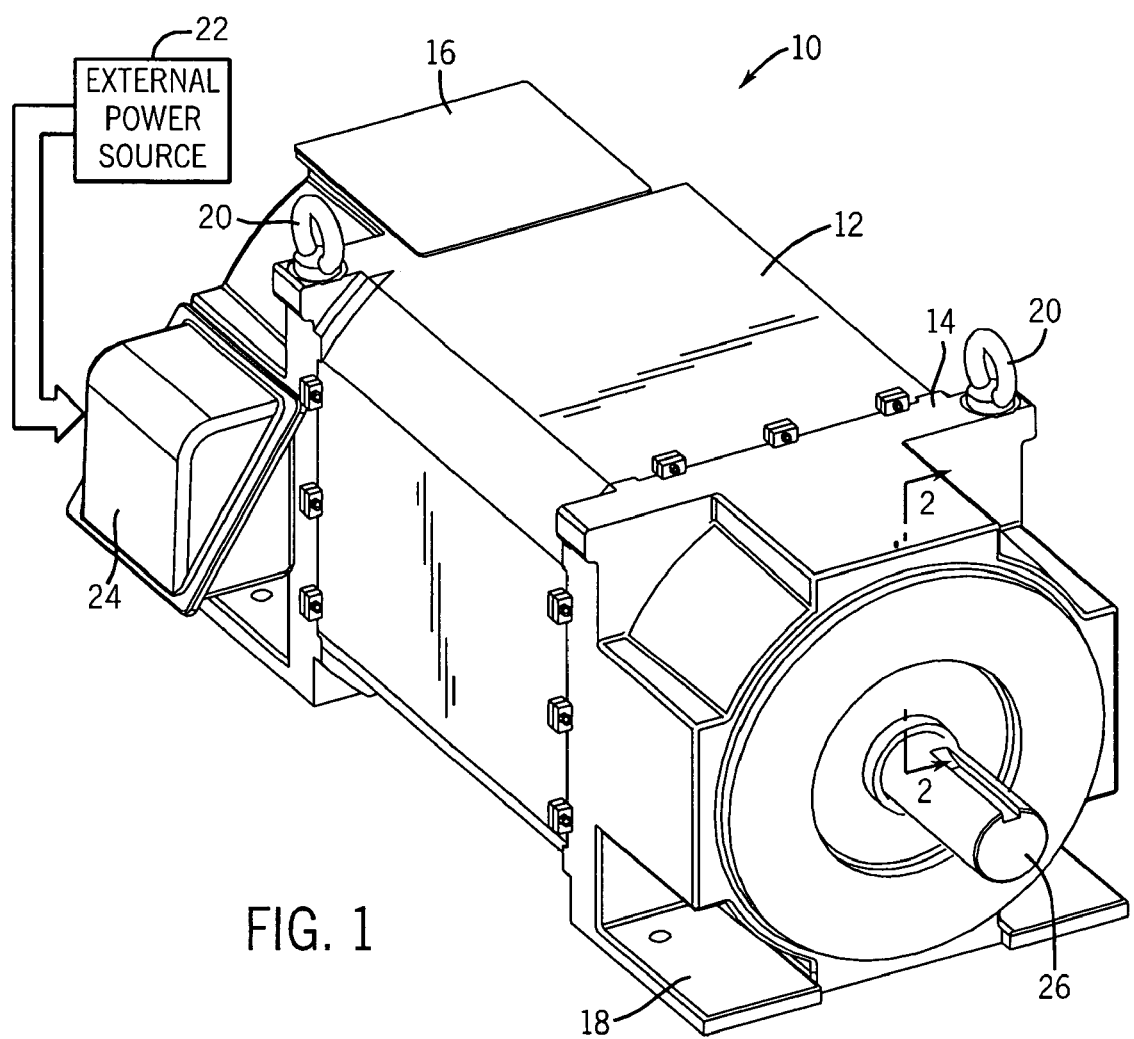
FIG. 1 is a perspective view of an induction motor, in accordance with an embodiment of the present invention.

Turning to the drawings, FIG. 1 illustrates an exemplary electric motor 10. In the embodiment illustrated, the motor 10 comprises an induction motor housed in a National Electric Manufacturers' Association (NEMA) motor housing. As appreciated by those of ordinary skill in the art, associations such as NEMA develop particular standards and parameters for the construction of motor housings or enclosures. The exemplary motor 10 comprises a frame 12 capped at each end by front and rear endcaps 14 and 16, respectively. The frame 12 and the front and rear endcaps 14 and 16 cooperate to form the enclosure or motor housing for the motor 10. The frame 12 and the front and rear endcaps 14 and 16 may be formed of any number of materials, such as steel, aluminum, or any other suitable structural material. The endcaps 14 and 16 may include mounting and transportation features, such as the illustrated mounting flanges 18 and eyehooks 20. Those skilled in the art will appreciate in light of the following description that a wide variety of motor configurations and devices may employ the construction techniques outlined below.

To induce rotation of the rotor, current is routed through stator windings disposed in the stator. (See FIG. 2). Stator windings are electrically interconnected to form groups which are, in turn, interconnected in a manner generally known in the pertinent art. The stator winding are further coupled to terminal leads (not shown), which electronically connect the stator windings to an external power source 22, such as 480 Vac three-phrase power or 110 Vac single-phase power. As another example, the external power source 22 may comprise an ac pulse width modulated (PWM) inverter. A conduit box 24 houses the electrical connection between the terminal leads and the external power source 22. The conduit box 24 comprises a metal or plastic material, and advantageously, provides access to certain electrical components of the motor 10. Routing electrical current from its external power source 22 through the stator windings produces a magnetic field that induces rotation of the rotor. A rotor shaft 26 coupled to the rotor rotates in conjunction with the rotor. That is, rotation of the rotor translates into a corresponding rotation of the rotor shaft 26. As appreciated by those of ordinary skill in the art, the rotor shaft may couple to any number of drive machine elements, thereby transmitting torque to the given drive machine element. By way of example, machines such as pumps, compressors, fans, conveyors, and so forth, may harness the rotational motion of the rotor shaft 26 for operation.

During operation, centripetal and centrifugal forces are produced in the rotor. If not accounted for, these forces may strain various components of the rotor, thereby leading to losses in performance and, in certain instances, failure of the rotor. Accordingly, as discussed further below, the exemplary rotor includes features that improve the mechanical integrity of the rotor and that facilitate operation of the rotor at higher speeds.

Figure 2:
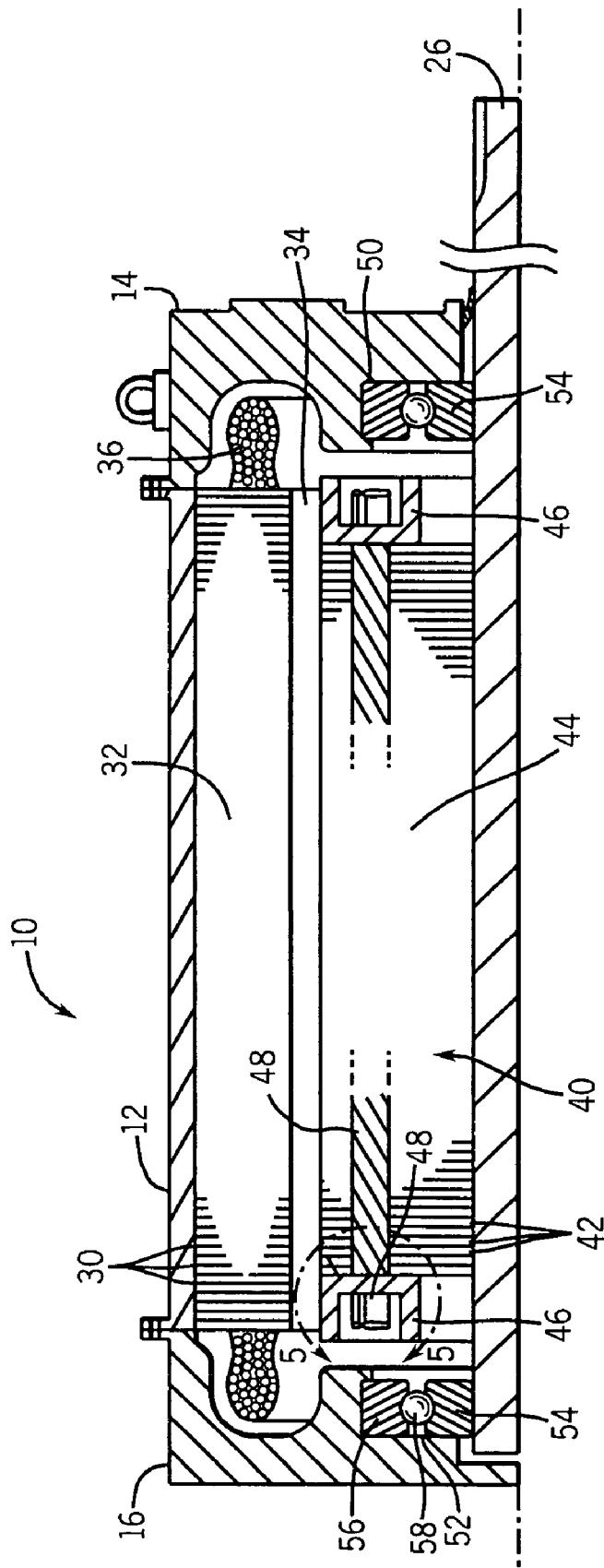
FIG. 2 is a partial cross-section view of the motor of FIG. 1 along line 2—2.

FIG. 2 is a partial cross-section view of the motor 10 of FIG. 1 along line 2—2. To simplify the discussion, only the top portion of the motor 10 is shown, as the structure of the motor 10 is essentially mirrored along its centerline. As discussed above, the frame 12 and the front and rear endcaps 14 and 16 cooperate to form an enclosure or motor housing for the motor 10. Within the enclosure or motor housing resides a plurality of stator laminations 30 juxtaposed and aligned with respect to one another to form a lamination stack, such as a contiguous stator core 32. In the exemplary motor 10, the stator laminations 30 are substantially identical to one another, and each stator lamination 30 includes features that cooperate with adjacent laminations to form cumulative features for the contiguous stator core 32. For example, each stator lamination 30 includes a central aperture that cooperates with the central aperture of adjacent stator laminations to form a rotor chamber 34 that extends the length of the stator core 32 and that is sized to receive a rotor. Additionally, each stator lamination 30 includes a plurality of stator slots disposed circumferentially about the central aperture. These stator slots cooperate to receive one or more stator windings 36, which are illustrated as coil ends in FIG. 2, that extend the length of the stator core 32.

In the exemplary motor 10, a rotor assembly 40 resides within the rotor chamber 34. Similar to the stator core 32, the rotor assembly 40 comprises a plurality of rotor laminations 42 aligned and adjacently placed with respect to one another. Thus, the rotor laminations 42 cooperate to form a contiguous rotor core 44. The exemplary rotor assembly 40 also includes rotor end members 46, disposed on each end of the rotor core 44, that cooperate to secure the rotor laminations 42 with respect to one another. When assembled, the rotor laminations 42 cooperate to form shaft chamber that extends through the center of the rotor core 44 and that is configured to receive the rotor shaft 26 therethrough. The rotor shaft 26 is secured with respect to the rotor core 44 such that the rotor core 44 and the rotor shaft 26 rotate as a single entity, the rotor assembly 40. The exemplary rotor assembly 40 also includes electrically conductive members, such as rotor conductor bars 48, disposed in the rotor core 44. As discussed further below, inducing current in the rotor assembly 40, specifically in the conductor bars 48, causes the rotor assembly 40 to rotate. By harnessing the rotation of the rotor assembly 40 via the rotor shaft 26, a machine coupled to the rotor shaft 26, such as a pump or conveyor, may operate.

To support the rotor assembly 40, the exemplary motor 10 includes front and rear bearing sets 50 and 52, respectively, that are secured to the rotor shaft 26 and that facilitate rotation of the rotor assembly 40 within the stationary stator core 32. During operation of the motor 10, the bearing sets 50 and 52 transfer the radial and thrust loads produced by the rotor assembly 40 to the motor housing. Each bearing set 50 and 52 includes an inner race 54 disposed circumferentially about the rotor shaft 26. The tight fit between the inner race 54 and the rotor shaft 26 causes the inner race 54 to rotate in conjunction with the rotor shaft 26. Each bearing set 50 and 52 also includes an outer race 56 and ball bearings 58, which are disposed between the inner and outer races 54 and 56. The ball bearings 58 facilitate rotation of the inner races 54 while the outer races 56 remain stationary and mounted with respect to the endcaps 14 and 16. As will be appreciated by those of ordinary skill in the art, the bearing sets 50 and 52 may present other constructions, such as sleeve bearings, for example. Thus, the bearing sets 50 and 52 facilitate rotation of the rotor assembly 40 while supporting the rotor assembly 40 within the motor housing, i.e., the frame 12 and the endcaps 14 and 16. To reduce the coefficient of friction between the races 54 and 56 and the ball bearings 58, the ball bearings 58 are coated with a lubricant.

Figure 3:
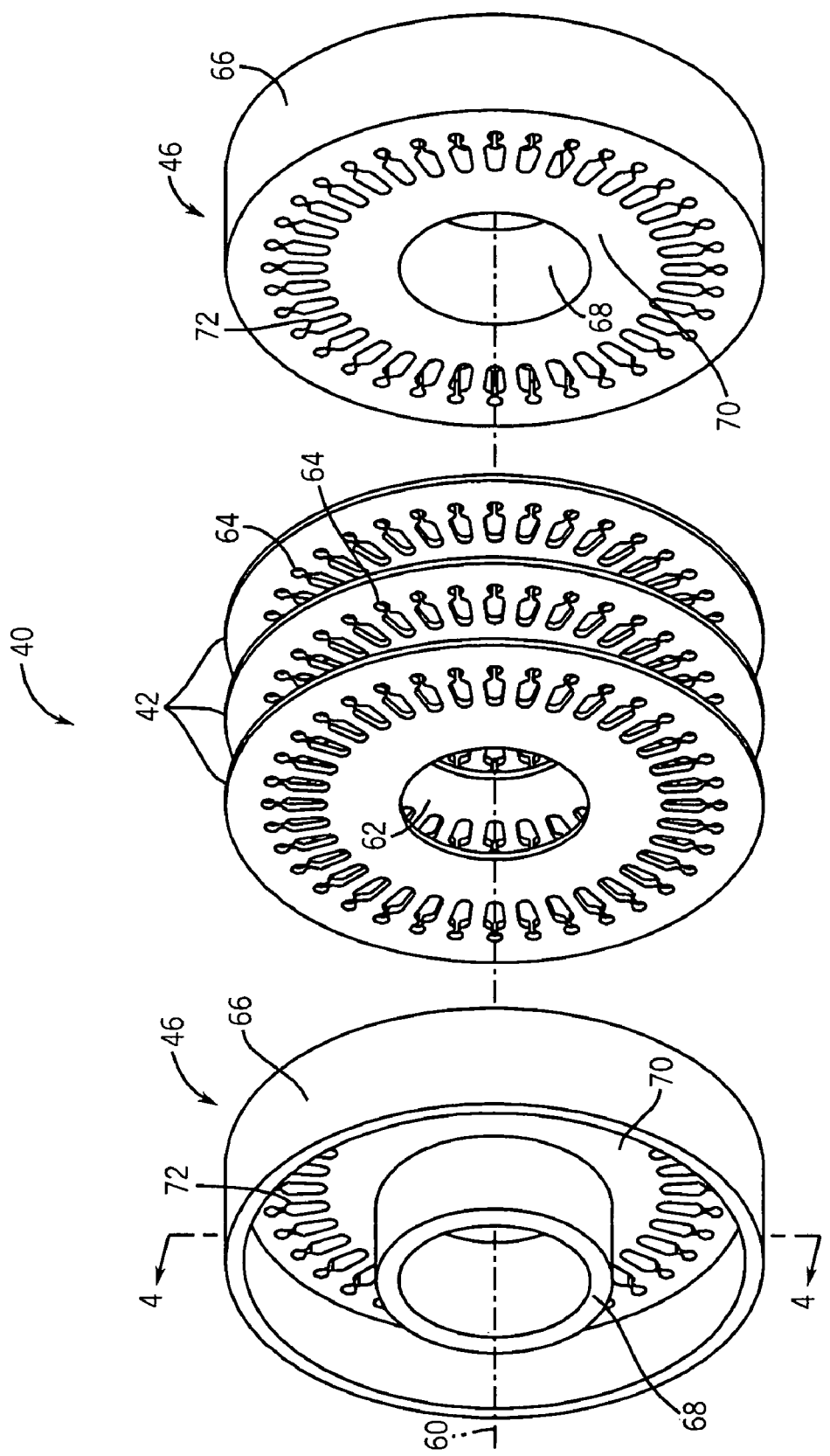
FIG. 3 is an exploded perspective view of a rotor, in accordance with an embodiment of the present invention.

FIG. 3 presents an exploded view of an exemplary rotor assembly 40, which includes a series of rotor laminations 42 disposed between a pair of end members 46. To maintain symmetry, the rotor laminations 42 and the end members 46 are concentrically disposed along an axial centerline 60. That is, the axial centerline 60 passes through the center of each of the end members 46 and each of the rotor laminations 42. Accordingly, the axial centerline 60 provides an axis of rotation for the assembled rotor 40.

Focusing on the rotor laminations 42, each lamination 42 has a generally circular cross-section and is formed of a magnetically conductive material, such as steel. Extending from end-to-end, i.e., transverse to the cross-section, each lamination 42 includes features that, when aligned with adjacent laminations 42, form cumulative features that extend axially through the rotor core 44. For example, each exemplary rotor lamination 42 has a circular shaft aperture 62 located in the center of the lamination 42. The shaft apertures 62 of adjacent laminations 42 cooperate to form a shaft chamber configured to receive the rotor shaft 26 (see FIG. 2) therethrough. Additionally, each lamination 42 includes a series of rotor slots 64 arranged in a concentric slot pattern. For example, in the illustrated laminations 42, thirty-six rotor slots 64 are arranged at equiangular and symmetric positions with respect to one another. Of course, other patterns and arrangements (e.g., twenty-four slot) are envisaged. When assembled, the rotor slots 64 cooperate to form concentric rotor channels (see FIG. 5) that extend through the rotor core 44. As discussed further below, the rotor channels are configured to receive electrically conductive and non-magnetic members, i.e., conductor bars 48, therethrough. (See FIG. 5.)

The end members 46, which are disposed on opposite ends of the rotor core 44, also contain certain features advantageous to the rotor assembly 40. To maintain rotational symmetry, the exemplary end members 46 are circular in cross-section and have a diameter that matches the diameter of the rotor laminations 42. Each end member 46 has an outer ring 66 that is concentric with an inner ring 68. As illustrated in FIG. 4, the inner ring 68 and the outer ring 66 are joined by an abutment portion 70, which is configured to abut the first or last lamination 42 of the rotor core 44. The outer ring 66 defines a flange portion that is located radially outboard of the inner ring 68 and the end slots 72, which extend through the abutment portion 70 between the inner and outer rings (see FIG. 4) and that are arranged in the slot pattern of the rotor slots 64. In the illustrated and exemplary embodiment, the end members 46 each has thirty-six end slots 72 that are arranged in the equiangular and symmetric slot pattern of the rotor laminations 42 and, as such, the rotor core 44.

Furthermore, as best illustrated in FIG. 4, the end members 46 each has a generally C-shaped cross-section because the end slots 72 and the rotor slots 64 are arranged in the same slot pattern, the end slots 72 align with the rotor slots 64 to define rotor channels (see FIG. 5) that extend axially through the rotor core 44 and the end members 46. As discussed further below, the conductor bars 48 extending through the rotor channels in cooperation with the end members 46 form at least one closed electrical pathway for induced current within the rotor 40. That is, the end members 46 and portions of the conductor bars 48 form electrically conductive end rings located at opposite ends of the rotor core 44. Accordingly, the conductor bars 48 and end members 46 comprise materials having good electrical conductivity, such as aluminum and copper.

FIGS. 5 and 6 provide detail views of a portion of the rotor core 44, an end member 46, and conductor bars 48 of FIG. 2. As illustrated, the abutment portion 70 of the end member 46 rests flush against the end of the rotor core 44. Accordingly, the rotor acts as a continuous assembly when assembled. Moreover, the end member 46 aligns with the rotor core 44 to form rotor channels 74 that extend axially through the end member 46 and the rotor core 44. More specifically, corresponding end slots 72 and rotor slots 64 cooperate to define the rotor channels 74, which extend axially through the rotor assembly 40 (i.e., rotor core 44 and end members 46). As discussed above, the rotor channels 74 support conductor bars 48 that extend therethrough. Advantageously, the conductor bars 48 may present the same shape as the rotor slots 64 and the end slots 72 to provide a tight fit for the conductor bars 48 within the rotor channels 74. That is, good tolerances between the conductor bars 48 and the rotor channels 74 facilitate a reduction in the occurrences of errant vibrations in the rotor 40 during operation, for instance.

Each conductor bar 48 has an external portion 80 that extends beyond the end members 46 and, as such, the rotor channel 74 and an interior portion 82 that is housed within the rotor channel 74. In the illustrated and exemplary embodiment, the external portions 80 of the conductor bars 48 are oblique (i.e., oblique portions) with respect to the remainder of the conductor bar 48. That is to say, the external portions 80 are bent or askew with respect to the interior portion 82 of the conductor bar 48. Advantageously, the end member 46, specifically each end slot 74, may provide a point of leverage for flexing the corresponding external portions 80. The oblique external portions 80 restrict movement of the end members 46. Specifically, the beginning of the oblique portion (i.e., the point of inflexion of the external portion 80) prevents axial movement of the end member 46 and, as such, at least partially secures the end member 46 with respect to the rotor core 44. In other words, the oblique portions provide an inwardly directed compression force (arrow 86) that, at least partially, secures the end members 46 and the rotor laminations 42 with respect to one another. Advantageously, the oblique portion may be fused to the end member 46 to improve the mechanical strength between the two members and to provide a good electrical connection between the conductor bar 48 and the end member 46. As discussed above, the end members 46 and the conductor bars 48 cooperate to form at least one closed electrical pathway for induced current in the rotor assembly 40.

To fuse the external portions 80 of the conductor bars to the corresponding end member 46, a number of techniques may be employed. As one example, a bonding layer 87 is formed. The bonding layer 87 electrically couples adjacent conductor bars 48 and fuses to adjacent conductor bars 48, thereby mechanically coupling the conductor bars 48 to one another. As discussed further below, this exemplary bonding layer 87 is formed by introducing a molten metal into a recessed portion 91 of the appropriate end member 46. Alternatively, the bonding layer 87 may be heating the conductor bars 48 to a molten state, thereby causing at least a portion conductor bars 48 to come into contact with one another and forming the bonding layer 87. Advantageously, the bonding layer 87 facilitates the use of non-electrically conductive material for the end member 46, thereby helping to control costs or increasing the robustness of the rotor, for instance.

Advantageously, the exemplary rotor provides a more well-defined architecture that facilitates modeling and analysis of the rotor assembly 40. For example, each of the conductor bars 48 may be substantially identical to one another. Moreover, each of these conductor bars 48 is placed in symmetric and equiangular rotor channels 74. Accordingly, the entire rotor assembly 40 may be modeled and analyzed, because of the consistency of construction in the rotor assembly 40. Moreover, the symmetrical relationships between the end rings, the rotor laminations and the conductor bars facilitate modeling and analysis of the rotor assembly 40 during operation.

Figure 7:
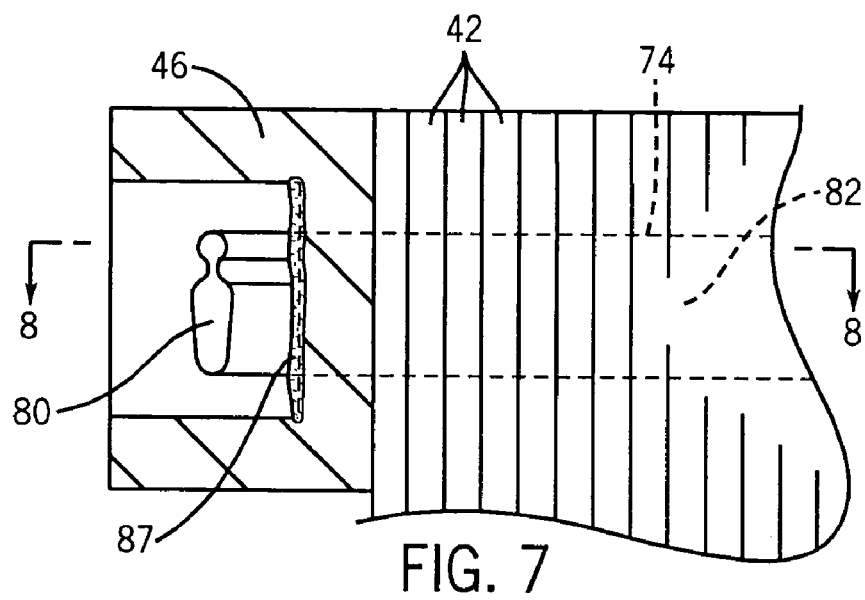
FIG. 7 is a partial cross-section view of a rotor end member assembly, in accordance with an embodiment of the present invention.
Figure 8:
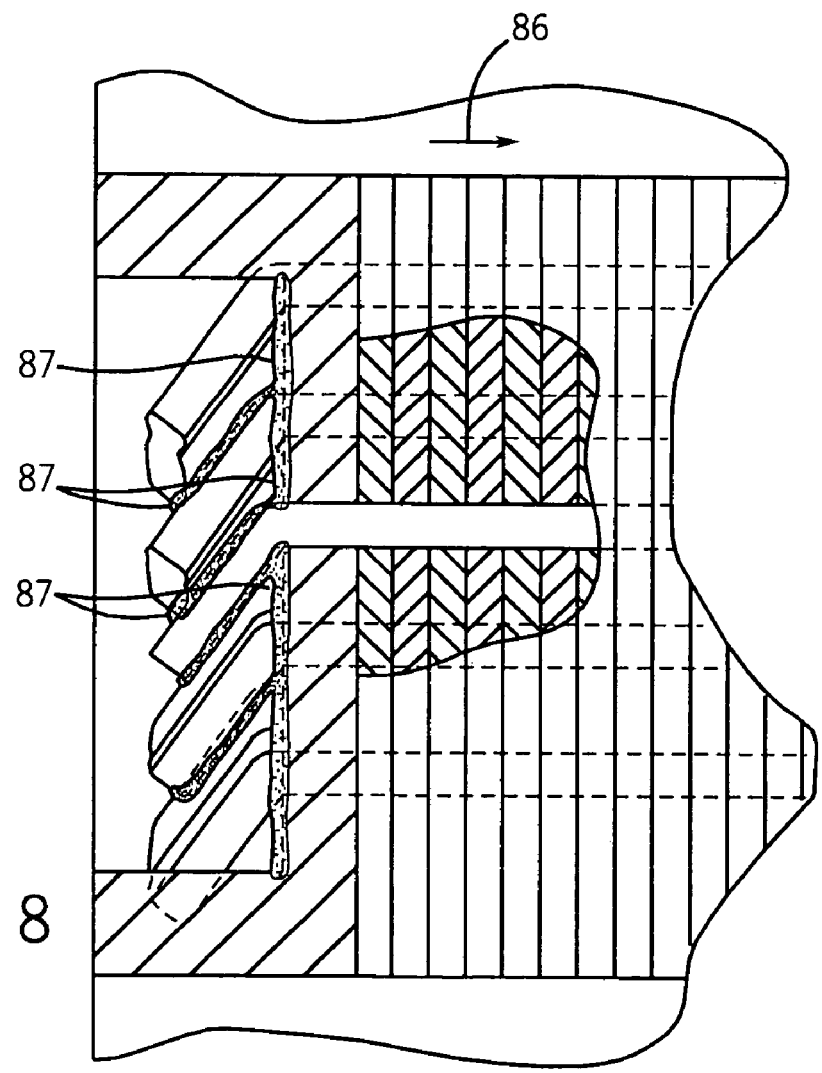
FIG. 8 is a partial cross-section view of the rotor end member assembly of FIG. 7 along line 8—8.

FIGS. 7 and 8 illustrate an alternate embodiment of the present invention. In this embodiment, the external portions 80 of the conductor bars 48 are collapsed onto one another. Accordingly, each external portion 80 mechanically buttresses the external portion of the conductor bar 48 lying beneath it. That is, the external portions cumulatively provide an inwardly directed compression force (arrow 86) that secures the end members 46 to the rotor core 44 and the rotor laminations 42 with respect to one another. Moreover, the collapsed conductor bars 48 come into contact with one another and, as such, electrically couple to conductor bars 48 to one another. The conductor bars 48 may be fused to one another to increase the mechanical and electrical coupling therebetween. By way of example, the conductor bars 48 may be welded to one another. As yet another example, the recessed portion 9 of the end member 46, which is defined by the outer ring 66, the inner ring 68 and the abutment portion 70, provides a mold in which the external portions 80 may be melted (i.e., fused) to one another as well as to the end member 46. That is, the external portions 80 may be heated and allowed to flow together to form a single piece, thereby electrical coupling the conductor bars 48 and mechanically securing the components of the rotor assembly 40. Thus, the external portions 80 may be heated to a molten state, and the end member 46 may guide this molten flow which, when cooled, fuses the conductive members 48 to one another. Alternatively, a molten material may be introduced into the recessed position 91. The molten material fuses the external portions 80 to one another, thereby forming the bonding layer 87 that electronically and mechanically connects to the conductor bars 80.

Figure 9:
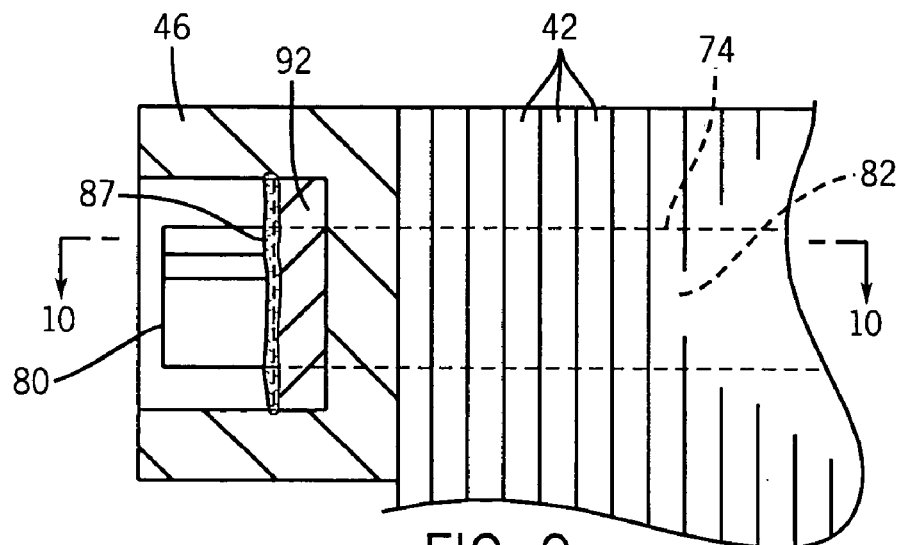
FIG. 9 is a partial cross-section view of a rotor end member assembly, in accordance with an embodiment of the present invention.
Figure 10:
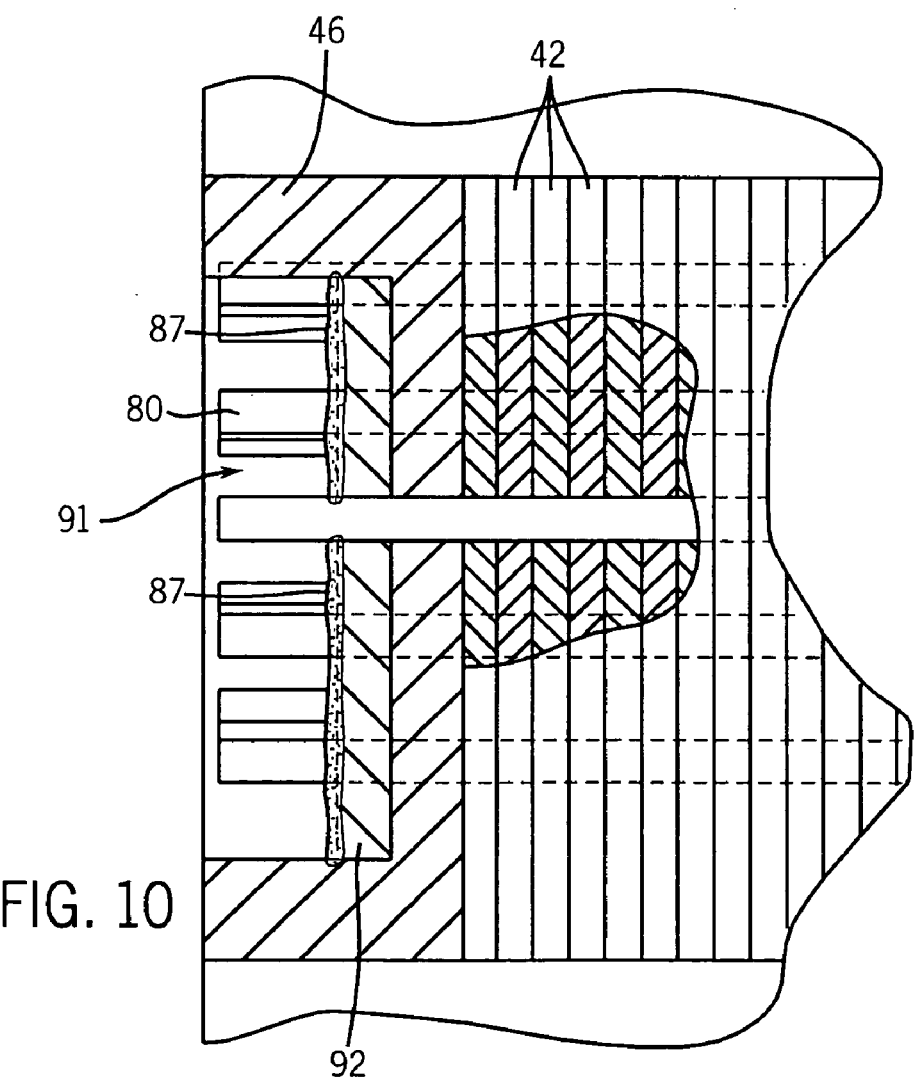
FIG. 10 is a partial cross-section view of the rotor end member assembly of FIG. 9 along line 10—10.

FIGS. 9 and 10 illustrate yet another embodiment of the present invention. In this embodiment, a securing member, such as the illustrated securing ring 92, electrically couples the conductor bars 48 to one another and secures the components of the rotor assembly 40. By way of example, the securing ring 92 may be formed of electrically conductive materials, such as aluminum or copper. Accordingly, the end member 46 may be formed of a dielectric material, which may be less costly. To prevent against errant vibrations, the securing ring 92 has good tolerances with respect to the inner and outer rings of the end member 46. Moreover, the securing ring 92 rests flush against the abutment portion 70. The exemplary securing ring 92 comprises a plurality of securing slots 94 that extend through the securing ring 92 and that have the same shape as the rotor slots 64 and the end slots 72. In cooperation with the external portions 80, the securing rings 92 provide an inwardly directed compression force (arrow 86) to the corresponding end members 46 and, as such, secure the end members 46 to the rotor core 44. Moreover, this compression force secures the laminations 42 with respect to one another. By way of example, the external portions 80 may be flexed to prevent axial movement of the securing rings 92, thereby securing the end members 46 and the rotor laminations 42 with respect to one another. As another example, the external portions 86 may be fused to the securing ring 92. For example, the external portions 80 may be fused to the securing ring 92 via the introduction of a molten metal that forms a bonding layer, thereby fixing the position of the securing ring 92 and securing the end members 46 and the rotor laminations 42 with respect to one another. Advantageously, the fusing the conductive members 46 to the securing ring 92 improves the electrical connection between the conductive members 46 and the securing ring 92, which functions as an electrical connection between the various conductive members 46.

Figure 11:
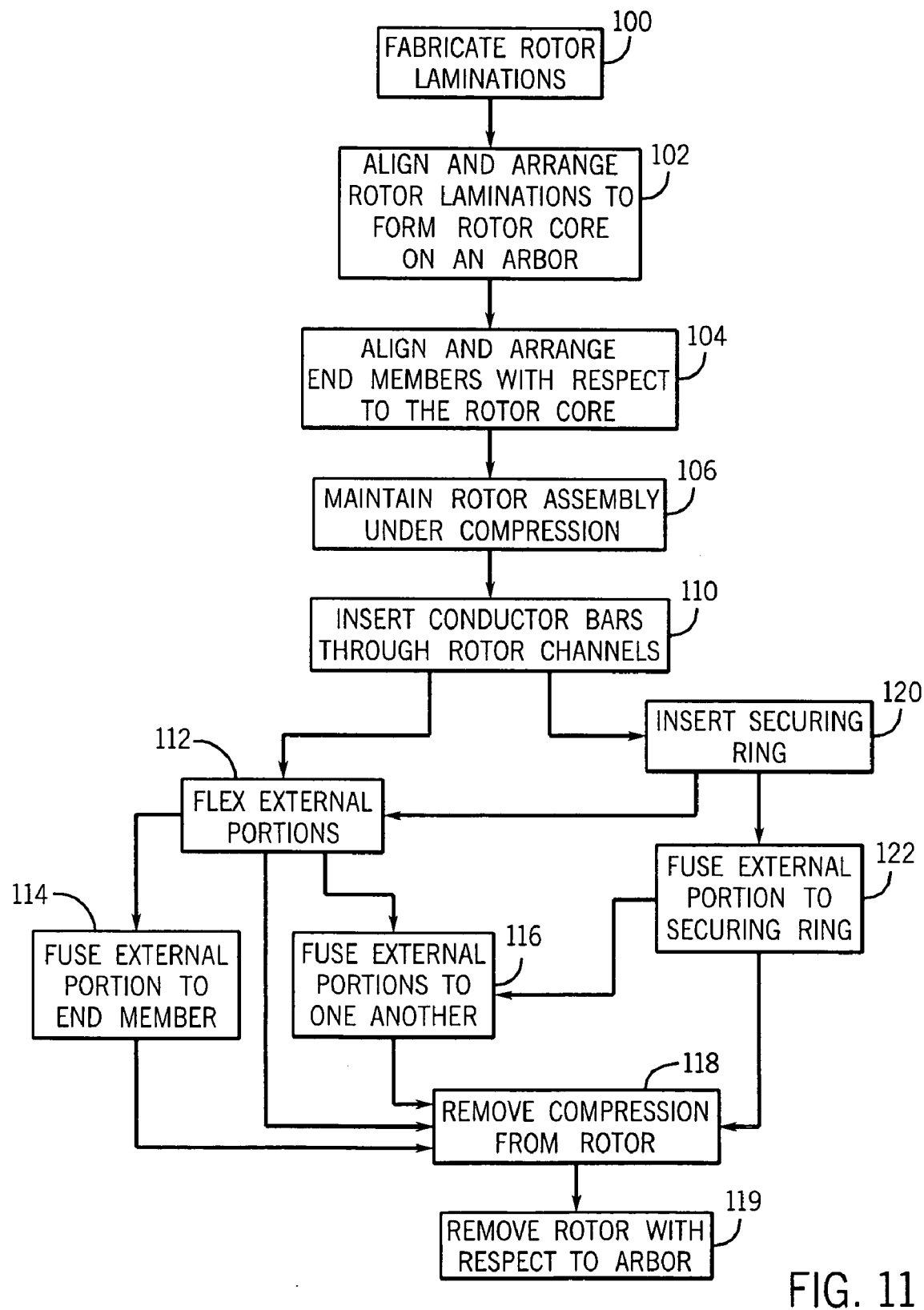
FIG. 11 is a flow chart representative of an exemplary process for fabrication of a rotor, in accordance with an embodiment of the present invention.

Keeping FIGS. 1–10 in mind, FIG. 11 represents an exemplary process for fabricating a rotor assembly 40. The process includes the act of fabricating a series of rotor laminations 42. (Block 100.) By way of example, rotor laminations 42 may be stamped from sheets of raw metal. To reduce fabrication costs, the exemplary rotor laminations 42 are substantially identical to one another. To form the rotor core 44, the rotor laminations 42 are arranged with respect to one another on an arbor, for instance. (Block 102.) As discussed above, the rotor laminations 42 cooperate to form features that extend the length of the rotor core 44. For example, the rotor laminations 42 cooperate to form rotor channels 74. The exemplary process also includes the act of aligning and placing the end members 46 with respect to the rotor core 44. (Block 104.) To provide a tight assembly of the rotor 40, the end members 46 and the rotor laminations 42 are maintained under compression. (Block 106.) The exemplary process also includes the act of inserting the conductor bars 48 through the rotor channels 74 of the rotor assembly 40. (Block 110.) As discussed above, the conductor bars 48 are disposed in the rotor channels 74 such that each conductor bar 48 has an external portion 80 extending beyond the rotor channel 74 and an interior portion 82 housed in the rotor channel 74.

The exemplary process also includes the act of flexing the external portions 80 within each end member 46. (Block 112.) That is, the external portions 80 may be bent (i.e., made oblique) with respect to the interior portion 82 of the conductor members 48. This flexing, as discussed above, restricts axial movement of the end members 46 and, as such, provides an inwardly directed compression force (arrow 86) that secures the end members 48 and the rotor laminations 42 with respect to one another. To improve the mechanical integrity of the rotor 40, the external portions 80 may be fused to the end members and/or to one another. By way of example, the external portions 80 may be fused to the corresponding end member 46 through the introduction of a molten metal that fuses with the external portions 80 and forms the bonding layer 87. (Block 114.) Furthermore, the external portions 80 may also be fused with respect to one another via the introduction of a molten metal. (Block 116.) As one example, adjacent external portions 80 may be friction stir welded to one another. As yet another example, the external portions may be heated to a molten state, thereby causing the molten metal to flow within the end members 46. Advantageously, the end members 46 act as channels that guide the molten flow. Once cooled, the molten flow then fuses the external portions 80 to one another. Because the external portions provide compression forces (arrow 86) to the end members 46 and to the rotor laminations 42 to secure the rotor assembly 40, the external compression force may be removed from the rotor assembly 40. (Block 118.) After removing the stack from the arbor (Block 119), the rotor shaft is installed with respect to the stack.

Alternatively, the end members 46 may be configured to receive a securing ring 92, which in turn comprises a series of securing slots that receive the external portions 80 therethrough. (Block 120.) Once the securing ring 92 is inserted, the external portions 80 may be flexed about the securing ring 92. (Block 112.) To improve the mechanical integrity and electrical communicativeness between the securing ring 92 and the external portions 80, the external portions 80 may be fused to the securing ring 92, via a welding process, for example. (Block 122.) Again, because the interaction between the securing rings 92 and the external portions 80 provides the inwardly directed compression force (arrow 86), the external compression force can be removed. (Block 118.)

While the invention may be susceptible to various modifications and alternative forms, specific embodiments have been shown by way of example in the drawings and have been described in detail herein. However, it should be understood that the invention is not intended to be limited to the particular forms disclosed. Indeed, the invention is to cover all modifications, equivalents, and alternatives falling within the spirit and scope of the invention as defined by the following appended claims.

The invention claimed is:

1. A rotor for an electrical device, comprising:
a rotor core having a core cross-section and a plurality of rotor slots extending through the rotor core generally transverse to the core cross-section;
a rotor shaft extending through the rotor core generally transverse to the core cross-section;
first and second end members disposed at opposite ends of the rotor core, each end member having a plurality of end slots cooperative with the plurality of rotor slots to define a plurality of rotor channels extending through the rotor core and the first and second end members and having a flange portion located radially outboard of the plurality of end slots; and
a plurality of electrically conductive members disposed in the plurality of rotor channels, wherein each electrically conductive member includes external portions that extend beyond the rotor channel and an internal portion housed within the rotor channel, and wherein the external portions are joined by a weld to the corresponding end member to electrically couple the conductive members to one another, wherein the first and second end members are held on the opposite ends of the rotor core by the electrically conductive members.

2. The rotor as recited in claim 1, wherein the end members have a C-shaped cross-section.

3. The rotor as recited in claim 1, comprising a bonding layer fused to the first end member and to at least two external portions.

4. The rotor as recited in claim 1, wherein the electrically conductive members or the end members comprises copper.

5. The rotor as recited in claim 1, wherein the electrically conductive members or the end members comprises aluminum.

6. The rotor as recited in claim 1, comprising a securing member having a plurality of securing slots configured to receive the external portions of the plurality of conductive members therethrough, wherein the security member is located radially inboard of the flange portion.

7. A rotor for an electrical device, comprising:
a rotor core having a core cross-section and a plurality of rotor slots extending through the rotor core generally transverse to the core cross-section;
a rotor shaft extending through the rotor core generally transverse to the core cross-section;
first and second end members disposed at nonadjacent ends of the rotor core, each end member including a plurality of end slots extending through the end members, wherein the end slots cooperate with the rotor slots to define a plurality of rotor channels extending through the rotor core and first and second end members; and
a plurality of electrically conductive members disposed in the plurality of rotor channels, each conductive member including oblique portions that extend beyond the rotor channel and an internal portion housed within the rotor channel, wherein the oblique portions at least partially secure the end members to the rotor core.

8. The rotor as recited in claim 7, wherein at least one oblique portion is fused to the corresponding end member.

9. The rotor as recited in claim 7, wherein the rotor core is configured for high-speed operation.

10. The rotor as recited in claim 7, wherein at least one pair of adjacent external portions are fused to one another.

11. The rotor as recited in claim 7, comprising a bonding layer fused to the first end member and to at least two oblique portions.

12. An electrical device, comprising:
an enclosure comprising first and second endcaps and a frame disposed between the endcaps;
a stator core disposed within the enclosure, the stator core including a plurality of stator windings configured to receive power from a power source and having a central aperture extending axially through the stator core; and
a rotor disposed in the central aperture, the rotor comprising:
a rotor core having a rotor core cross-section and a plurality of rotor slots extending through the rotor core generally transverse to the rotor core cross-section;
first and second end members disposed on opposite ends of the rotor core, each end member including a plurality of end slots extending through the end members, wherein the end slots and the rotor slots cooperate to define a plurality of rotor channels extending from the first end member to the second end member; and a plurality of electrically conductive members disposed in the plurality of rotor channels wherein each conductive member includes oblique portions that extend beyond the rotor channel and an internal portion housed within the rotor channel, and wherein the oblique portions are configured to at least partially secure the end members to the rotor core.

13. The electrical device as recited in claim 12, wherein the stator windings are configured to receive power from an alternating current (ac) power source.

14. The electrical device as recited in claim 13, wherein the ac power source comprises a three-phase power source.

15. The electrical device as recited in claim 13, wherein the ac power source comprises a pulse width modulated (PWM) power source.

16. The electrical device as recited in claim 13, wherein the rotor is configured for high-speed operation.

17. The electrical device as recited in claim 12, wherein at least one pair of adjacent oblique portions are fused to one another.

18. The electrical device as recited in claim 12, wherein at least one oblique portion is fused to the corresponding end member.

19. An electrical device, comprising:
an enclosure comprising first and second endcaps and a frame disposed between the endcaps;
a stator core disposed within the enclosure, the stator core including a plurality of stator windings configured to receive power from a power source and having a central aperture extending axially through the stator core; and
a rotor comprising:
a rotor core having a generally circular core cross-section and a plurality of rotor slots extending through the rotor core generally transverse to the core cross-section;
a rotor shaft extending through the rotor core generally transverse to the core cross-section;
first and second end members disposed at opposite ends of the rotor core, each end member including a plurality of end slots cooperative with the rotor slots to define a plurality of rotor channels extending through the rotor core and the first and second end members; and
a plurality of electrically conductive members disposed in the plurality of rotor channels such that the each electrically conductive member includes external portions that extend beyond the rotor channel and an internal portion housed within the rotor channels; and joined by a weld to at least two electrically conductive members, wherein the first and second end members are held on the opposite ends of the rotor core by the electrically conductive members.

20. The electrical device as recited in claim 19, wherein the stator windings are configured to receive power from an alternating current (ac) power source.

21. The electrical device as recited in claim 20, wherein the ac power source comprises a three-phase power source.

22. The electrical device as recited in claim 20, wherein the ac power source comprises a pulse width modulated (PWM) power source.

23. The electrical device as recited in claim 19, wherein the rotor is configured for high-speed operation.

24. The electrical device as recited in claim 19, wherein the conductive members or the end members comprise aluminum.

25. The electrical device as recited in claim 19, wherein the external portions are oblique with respect to the internal portions.

* * * * *